Jan. 16, 1934. C. W. P. HEYLANDT Re. 19,054
METHOD AND DEVICE FOR PRODUCING COMPRESSED GAS FROM LIQUEFIED GAS
Original Filed Jan. 3, 1930
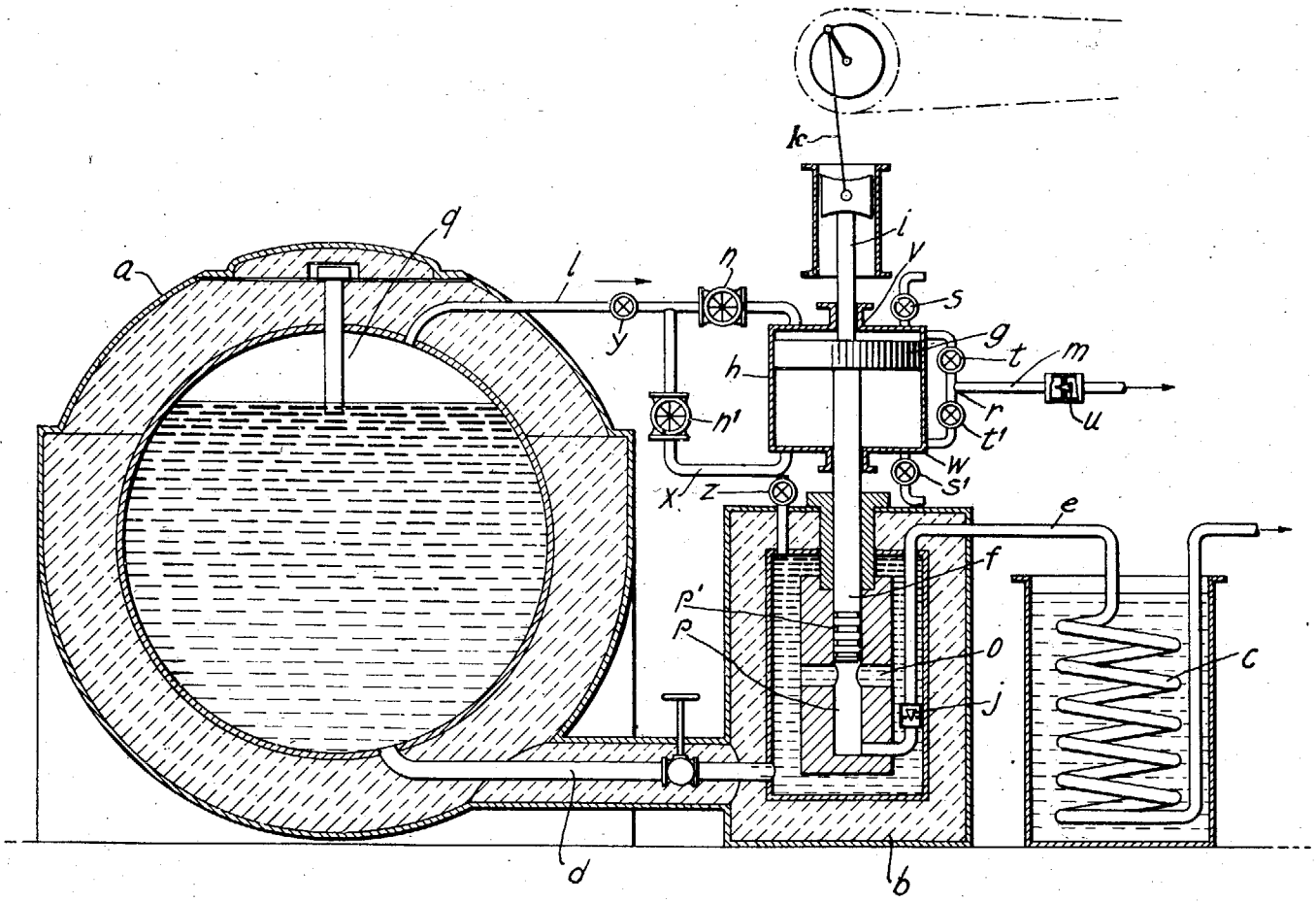
INVENTOR
Christian Wilhelm Paul Heylandt
BY
Watson, Bristol, Johnson & Leavenworth
ATTORNEYS Reissued Jan. 16, 1934

Re. 19,054

UNITED STATES PATENT OFFICE

REISSUED 19,054

METHOD AND DEVICE FOR PRODUCING COMPRESSED GAS FROM LIQUEFIED GAS

Christian Wilhelm Paul Heylandt, Berlin-Britz, Germany, assignor to Fluga Aktiengesellschaft, St. Moritz, Switzerland, a corporation of Switzerland Original No. 1,812,954, dated July 7, 1931, Serial No. 418,345, January 3, 1930, and in Germany January 5, 1929. Application for reissue March 28, 1933. Serial No. 663,169

15 Claims. (Cl. 62—1)

The present invention relates to an improvement in processes and apparatus for delivering gas material, the principal object of the invention being to provide an improved process and apparatus by means of which the gas material may be conveyed in the liquid phase to the place of consumption and there delivered in the gas phase highly compressed.

It has heretofore been the practice, in handling a liquefied gas having a low boiling point, for example liquid nitrogen, oxygen and the like, to vaporize the liquid at the place of production and compress the vapor to the desired pressure in heavy steel vessels or cylinders before transporting the gas to the place of consumption. The object of the present invention, accordingly, is to provide means whereby it is possible to transport the gas in the liquid phase and deliver it at the place of consumption at any desired pressure, thereby eliminating the high cost of transporting the heavy steel vessels heretofore employed for containing the compressed gas, and to utilize the vaporization products evolved during transportation to assist in transferring the liquefied gas from its storage receptacle and deliver it in vaporized condition at the desired pressure.

In accordance with the invention, liquefied gases, such as liquid oxygen, nitrogen, methane and the like, after being transported in the liquid phase to the place of consumption, are transferred there from the transporting container to another receptacle capable of standing a higher or lower pressure by means of a conveying device, for instance a pump, into a high pressure system of receptacles or pumps, where the gas by the aid of known means is evaporated and raised to the desired working pressure.

Such a process has considerable advantages over those heretofore known. Apart from the advantage gained by the considerably reduced cost of transporting the gas in the liquid phase as compared with the transportation of compressed gas in heavy steel cylinders, the amount of compression work necessary at the place of consumption is very small since the ratio of the volume of such gas under standard conditions to the volume of liquid employed is of the order of 800:1. It must further be considered that the liquefied gas after having been conveyed by the liquid pump may be converted from the liquid to the gaseous phase partly or entirely by self-compression, which latter may be readily effected by applying heat from without. It need not be emphasized that gas under pressure, when produced in this manner at the place of consumption from the liquid material, is in a perfectly dry condition.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention, reference should be had to the following detailed description taken in connection with the accompanying drawing, in which:

The figure illustrates mainly diagrammatically a sectional view of an apparatus according to the invention.

Referring to the drawing, *a* designates a double-walled insulated container or vessel adapted to contain a liquefied gas for use either in storing or for transporting the same to the place of use. A second double-walled substantially closed insulated casing *b* communicates by way of a valved pipe *d* with the interior of the vessel *a* at substantially the lowermost point thereof, the said pipe being also insulated. Within the casing *b* is disposed a pump housing *p*, the wall of said housing being spaced from the inner wall of the insulating casing thereby to provide a space for the reception of liquefied gas within said casing so as to submerge completely the pump housing. The housing *p* has a discharge pipe *e* connected with a vaporizer *c*, the outlet from which is adapted for connection with a high-pressure receiving vessel not shown. A piston *p'* works within the bore of housing *p*, so that upon reaching its upper limit of travel, its lower edge uncovers the ports *o* in the wall of housing *p*. The bore then fills with liquefied gas by the action of gravity, any vapor in the bore escaping through the ports. Disposed in the discharge pipe *e* near the lower part of the housing *p* is a non-return valve *j* preventing backflow of gas material into the pump housing. The piston *p'* of the pump is carried by a rod *f* and is actuated in any convenient manner, for example by a gas-engine, here illustrated as comprising a housing *h* within which is disposed a second or actuating piston *g* connected to the rod *f*. The piston rod *f* is preferably extended beyond the housing *h*, as shown at *i*, in order that it may be driven through other means such as a connecting rod *k* actuated by a crank which is operated from any suitable source of power.

The housing *h* is provided with a closure *v* through which passes a pipe *l* to provide communication with the space *q* that is in the upper part of the container *a*, above the liquid. The housing *h* at its opposite end also communicates with the pipe *l*, and therefore with the space *q* of the liquid container, by way of a pipe *x* which enters the housing through the bottom thereof, the pipes *l* and *x* being provided with valves *n* and *n'*, respectively, which are operative to admit gas under pressure from the space *q* of the container *a* alternately to opposite sides of the piston *g*. The pipe *l* is preferably provided with a valve *y* for shutting off all communication between the housing *h* and the container *a*. The housing *h* is provided adjacent its opposite ends with a pair of outlet ports communicating by a pipe *r* with an exhaust pipe *m*, the pipe *r* being provided with valves *t*, *t'* disposed respectively at opposite sides of its connection with the pipe *m*, the opening and closing of said valves being controlled by the movements of the piston *g* in opposite directions for exhausting the housing *h*. The housing *h* is further provided in its top and bottom with vent ports controlled by valves *s* and *s'*, respectively, which may be manually opened if for any reason the pressure in the space *q* has fallen so low that it is no longer capable of assisting to drive the piston *g*, in which case the valve *y* is closed. The exhaust pipe *m* is preferably provided with a non-return valve *u*. The casing *b* is vented when desired by means of a valve *z*.

During transportation of the liquefied gas, or while no withdrawal of the same is taking place, the normal relatively slow leakage of heat into the liquid from external sources causes the pressure within the vessel *a* to increase. The increased pressure may reach, for example, a value of 5 atmospheres during transportation, or in the case of a stationary apparatus, to a value of 15 atmospheres. After the destination has been reached, withdrawal of liquefied gas is begun by starting the liquid pump *p* and by opening valve *y*, the gaseous pressure existing in the space *q* may be admitted to act directly on the piston *g*, and thereby assist in supplying power to drive the pump while effecting the transfer of the liquefied gas and force the same against the pressure of the products of vaporization.

If for any reason, the pressure prevailing above the liquid in the transporting vessel *a* has fallen to such an extent that it is not worthwhile to use it for assisting to drive the liquid pump, the valve *y* is closed. In order to avoid the production of objectionable compression within the casing *h*, the valves *s* and *s'* communicating respectively with the casing *h* at its upper and lower ends, are then opened. The non-return valve *u* disposed in the conduit *m* prevents the return of pressure gas from said pipe to the housing *h* and out through the open valves *s* and *s'*.

If the pipe line *l* is shut off by the closing of the valve *y*, as above described, the pressure within the space *q* of vessel *a* will act on the liquid, whereby the suction of the pump is assisted and the load partially taken off from the driving machine.

An advantageous development of the process is that the transporting vessel, or the receptacle in which the gas prior to its transfer to the high pressure system is stored, may be so constructed as to permit a partial or total heating of its contents thereby to produce gas at a predetermined pressure, which may be employed for driving the liquid feeding installation. It will then only be necessary that the gases from the liquid container be brought to a slightly higher pressure than usually required by self-compression in the service pipe line in order to make them available for use as high pressure gas. This pressure gas may then be allowed to pass into a power engine apparatus (cylinder with piston, turbine or the like) and with the power thus obtained, the liquid delivering apparatus will require very much less mechanical work for driving the same.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. The method of delivering gas, which comprises transferring gas in the liquid phase from a closed container to a low pressure chamber, mechanically transferring the liquefied gas from said low pressure chamber to a high pressure chamber, utilizing the pressure of the gas in said container for driving the device which mechanically transfers the liquefied gas to the high pressure chamber, and vaporizing said transferred liquid whereby it is converted into gas at a desired high pressure.

2. The method of delivering gas, which comprises transferring gas in the liquid phase from a closed container to a low pressure chamber, mechanically transferring the liquefied gas from said low pressure chamber to a high pressure chamber, utilizing the pressure of the gas in said container to assist in mechanically transferring the liquefied gas to the high pressure chamber, and vaporizing said transferred liquid whereby it is converted into gas at a desired high pressure.

3. The method of delivering gas, which comprises transferring gas in the liquid phase from a closed container to the piston chamber of a pump, mechanically pumping the liquefied gas from said chamber into a receiver against a relatively high pressure, utilizing the pressure of the gas in said container to assist in mechanically transferring the liquefied gas, and vaporizing the liquefied gas during its passage from said pump chamber to said receiver.

4. An apparatus for delivering gas comprising, in combination, a container for a segregated body of liquefied gas, a piston-pump having a chamber connected directly to said container below the normal liquid level therein and provided with piston uncovered inlets, a vaporizer connected to receive the discharge from said piston-pump, means for preventing return-flow in said discharge connection from said vaporizer into said pump-chamber, means for thermally insulating said container, and a closed insulating envelope for said piston-pump and its connections.

5. An apparatus for delivering gas comprising, in combination, a container for a segregated body of liquefied gas, a piston-pump having a chamber connected to said container below the normal liquid level therein, means utilizing the gas pressure in said container for assisting in effecting the transfer of liquefied gas by said pump, a vaporizer connected to receive the discharge from said pump, and means for preventing return-flow in said discharge connection from said vaporizer into said pump.

6. An apparatus for delivering gas comprising, in combination, an insulated container for liquefied gas, a substantially closed insulated chamber communicating with said container below the normal liquid level therein, a pump having a casing submerged in the liquid within said casing, means for actuating said pump, and a vaporizer connected to receive the discharge from said pump.

7. An apparatus for delivering gas comprising, in combination, an insulated container for liquefied gas, a substantially closed insulated chamber communicating with said container below the normal liquid level therein, a reciprocating pump having a casing submerged in the liquid within said chamber and provided with a piston uncovered inlet communicating with said chamber, a discharge connection, valved means controlling the same, a high pressure vaporizer communicating with said discharge, power means for actuating said pump, and means utilizing the gas pressure in said container for assisting in effecting the transfer of liquefied gas by said pump.

8. An apparatus for producing pressure gas from liquefied gas of low boiling point, comprising in combination, a closed insulated low pressure storage vessel, a second closed insulated vessel communicating with said low pressure vessel below its liquid level, a pressure pump disposed within said second vessel, a piston in said pump having a rod extending outside of said second vessel, a housing outside of said second vessel and having an axial opening for the passage of said piston rod therethrough, a piston secured to said rod within said housing, a valve-controlled communicating means connecting said housing at opposite sides of its piston with said low pressure vessel above its liquid level, thereby to admit pressure gas from said vessel to the housing to assist in causing reciprocation of said piston rod and pistons, means for permitting exhaust of pressure gases from said housing at opposite sides of its piston, mechanical means connected with said piston rod for reciprocating the same, and vaporizer communicating with said pump.

9. The method of delivering a low boiling point gas, which comprises charging a transport container with a body of gas in the liquid phase at a relatively low pressure, withdrawing portions of said charge and delivering the same unimpededly to a transportable pump, mechanically actuating said pump to force a discharge of all of said withdrawn portions against a substantially higher pressure, and excluding substantially completely the entry of heat from said portions until discharged at said higher pressure.

10. The method of delivering a low boiling point gas, which comprises charging a transport container with a body of gas in the liquid phase at a relatively low pressure, withdrawing portions of said body and delivering the same unimpededly to a pump transportable with said container, mechanically actuating said pump to force the discharge of all of said withdrawn portions against a substantially higher pressure, and substantially completely insulating said pump and container to exclude heat of external origin from said portions until discharged at said higher pressure.

11. The method of delivering gaseous oxygen, which comprises charging a transport container with a segregated body of liquid oxygen at a relatively low pressure, withdrawing portions of said body by means of natural forces in the system and delivering the same unimpededly to a pump transportable with said container, mechanically actuating said pump to force the discharge of all of said withdrawn portions against a substantially higher pressure, substantially completely thermally insulating said container and pump to exclude the entry of heat of external origin from said portions until discharged at said higher pressure, and subsequently vaporizing said discharged portions whereby a supply of gaseous oxygen at a desired high pressure is produced.

12. A transportable apparatus for delivering gas comprising, in combination, a transportable container for liquefied gas of low boiling point, a transportable reciprocating pump having a piston controlled inlet valve and a pressure controlled outlet valve connected to receive liquid from said container and communicating therewith below the liquid level therein, mechanical means for actuating said pump to cause the received liquid to discharge against a relatively high pressure, heat insulation disposed substantially completely about said container and pump whereby heat of external origin is substantially completely excluded prior to the discharge at said relatively high pressure, and means for receiving said portions discharged at high pressure for the subsequent application of heat.

13. A transportable apparatus for delivering oxygen comprising, in combination, a transportable container for liquid oxygen, a transportable reciprocating pump having a piston controlled inlet valve and a pressure controlled outlet valve connected to said container below the liquid level and arranged to receive successive charges under the action of natural forces operating in the system, mechanical means for actuating said pump to cause the same to discharge said portions against a relatively high pressure, heat insulation disposed about said container and pump and arranged to exclude substantially completely heat of external origin from said portions of liquid oxygen until discharged at said relatively high pressure, and means for receiving said discharged portions at said relatively high pressure adapted for the subsequent vaporization of said discharged portions.

14. The method of delivering a liquefied gas of low boiling point in heat insulated transport containers, which method comprises maintaining the container closed to the atmosphere when filled with liquefied gas, accumulating the vapor generated within said container during the periods when said container is being transported, positively transferring liquid to service a closed system, and utilizing the accumulated vapor to assist the servicing of the liquid directly to the closed system during the interval between transport periods.

15. The method of delivering a liquefied gas of low boiling point in heat insulated containers, which method comprises maintaining the container closed to the atmosphere when filled with liquefied gas, accumulating the vapor generated within said container during periods of non-withdrawal of liquid from the container, transferring liquid from said container and forcing it into a closed system and utilizing the energy of the accumulated vapor to assist in effecting a transfer of gas material through a closed system during periods of liquid withdrawal.

CHRISTIAN WILHELM PAUL HEYLANDT.